Figure 1:
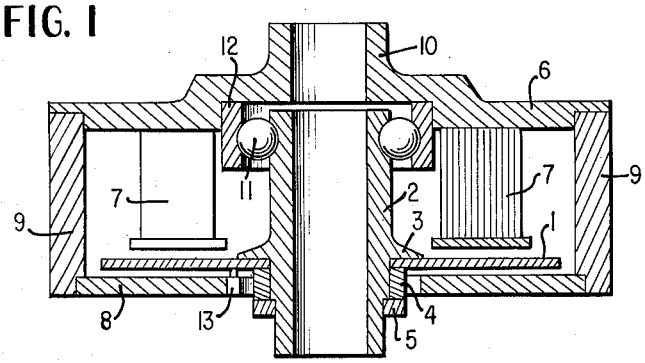

Jan. 18, 1966  J. HENRY-BAUDOT  3,230,408
AXIAL AIRGAP ELECTRIC ROTARY MACHINES
Filed March 3, 1961  2 Sheets-Sheet 1

INVENTOR
JACQUES HENRY-BAUDOT

BY *Kenyon, Palmer, Steward & Estabrook*

ATTORNEYS.

Jan. 18, 1966   J. HENRY-BAUDOT   3,230,408
AXIAL AIRGAP ELECTRIC ROTARY MACHINES
Filed March 3, 1961   2 Sheets-Sheet 2

INVENTOR
JACQUES HENRY-BAUDOT

BY Kenyon, Palmer, Stewart & Estabrook
ATTORNEYS.

United States Patent Office 3,230,408
Patented Jan. 18, 1966

3,230,408
AXIAL AIRGAP ELECTRIC ROTARY MACHINES
Jacques Henry-Baudot, Antony, France, assignor to
Printed Motors Inc., New York, N.Y.
Filed Mar. 3, 1961, Ser. No. 93,187
Claims priority, application France, Mar. 10, 1960,
821,153, Patent 1,259,056
8 Claims. (Cl. 310—268)

The present invention concerns improvements in or relating to axial airgap electric rotary machines, specially such machines wherein the armature includes a discoidally-shaped winding made of flat conductors intimately adhering to both insulating faces of an annular carrier over which said conductors are distributed as two sets of half-turn conductors the peripherical ends of which are interconnected from one face to the other one in order to complete the electrical pattern of the winding proper.

It is an object of the invention to so provide an improved arrangement of such machines that enables either the inductor part or the armature thereof to be made revolving in the final use of the machine.

A further object of the invention is to so provide such an arrangement that the inductor and armature parts of the machine may be set at any required angular relative position for the final use of the machine, whatever member is chosen as the revolving part thereof.

Another further object of the invention is to so provide such an arrangement that the inductor and armature of the machine, in its final use, may be adapted to present a relative revolving shaft.

According to the invention and in view of the above stated objects, an axial airgap electric rotary machine is mainly characterized in that the winding-carrying armature is mounted on a sleeve and the inductor part of the machine, or at least the ring of poles thereof, is journalled in bearings supported by at least one end of said sleeve.

According to a further feature of the invention, such a machine comprises, when required, one pair of coaxial conducting rings applied to a wall of the inductor part of the machine, each ring being electrically connected to at least one brush supported by said inductor part and bearing in slidable fashion against the armature winding, said conductive rings cooperating with at least one pair of sliders carried by a carrier plate of the machine for the electrical current translation thereto.

According to a further feature of the invention, at least one rotation transmitting gear is provided, when required, between the coaxial inductor and armature sleeve for ensuring a differential relative displacement of said parts of the machine.

Figure 2:
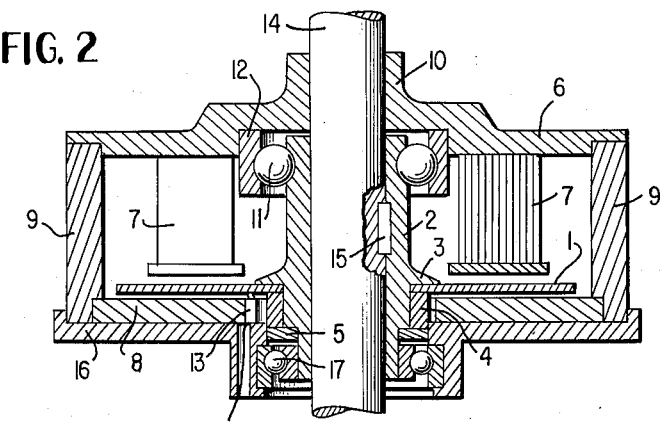
Figure 3:
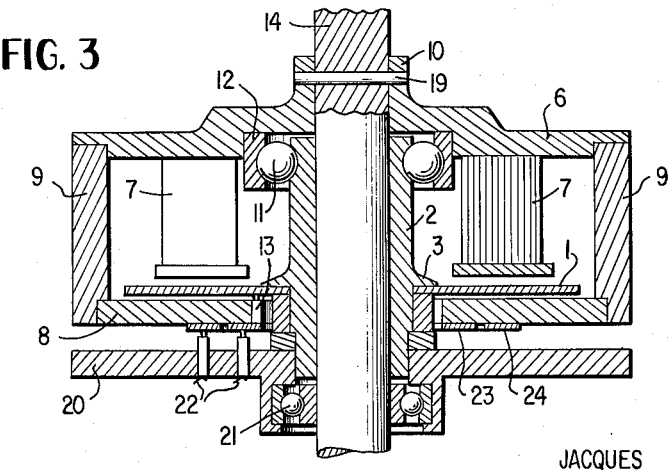
Figure 4:
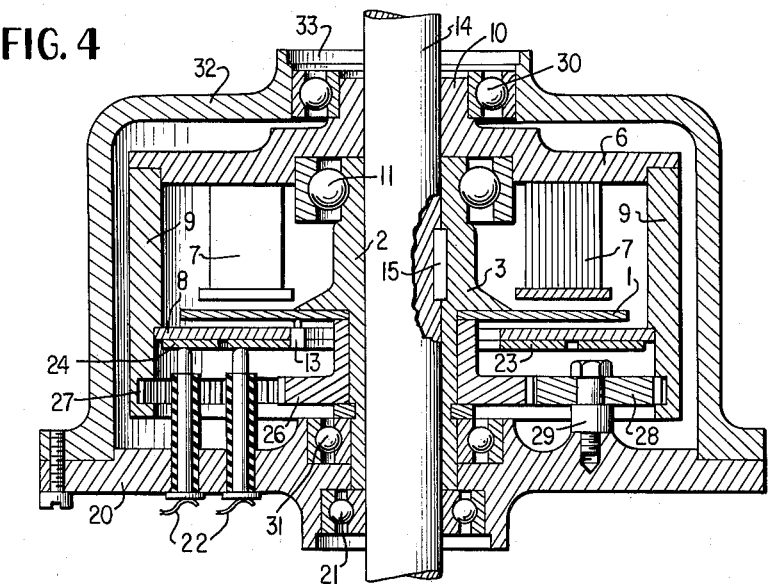
Figure 5:
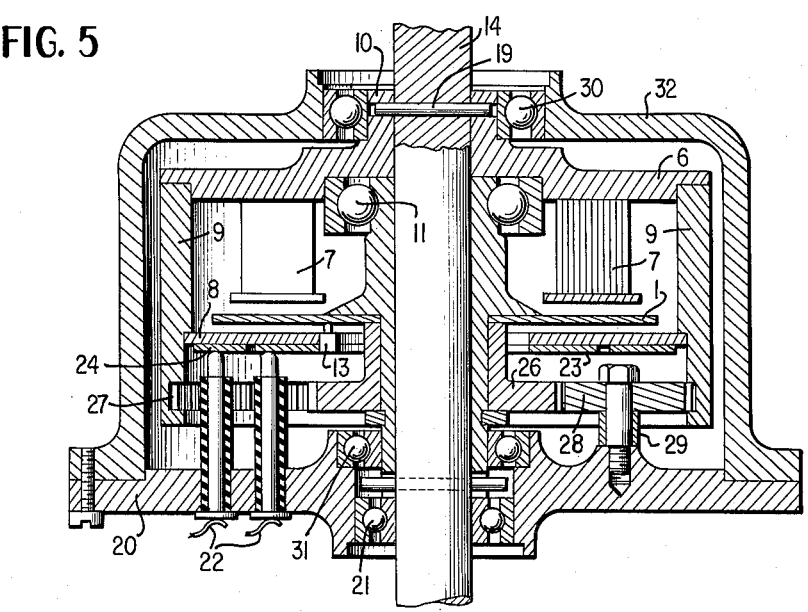
Figure 6:
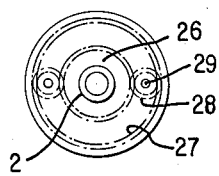

These and further objects and features of the invention will be fully explained with reference to the accompanying drawings, wherein:

FIG. 1 is a cross-section view of the basic arrangement of a machine according to the invention;

FIG. 2 and FIG. 3 respectively show arrangements of machines in accordance with FIG. 1, considering both cases when the armature, FIG. 2, or the inductor, FIG. 3, is the rotatable member in the machine;

FIGS. 4 and 5 respectively show machines according to FIGS. 2 and 3, including gear means between their armature and inductor members; and, FIG. 6 shows the diagram of such a gear transmission between armature and inductor members.

Any technological modification of such shown arrangements obviously falls within the scope of the invention. In the drawings, the case is contemplated of an inductor part solely comprising one ring of magnetic pole pieces on one side of the armature disk-shaped member, and said pieces are shown as protruding ones. By "technological modification" are meant the following ones, apparent per themselves from the shown examples:

(1) Two rings of polar pieces facing each other on opposite sides of the armature;

(2) A magnetic yoke mechanically united to the disk armature on the side opposite to that of the inductor member;

(3) For the protruding pole pieces is substituted a ring of a material such as a ferrite wherein the magnetic poles are impressed and maintained by magnetization process;

(4) The inductor "cage" is journalled on both ends of the armature sleeve.

Referring to FIG. 1, the armature disk-shaped member is shown at 1 and is carried by a sleeve 2. Said armature may for instance be applied against an annular extension 3 of the sleeve and secured thereagainst by means of a sleeve 4 pressed by a threaded ring 5.

The inductor comprises, on a conformated plate 6, a plurality of magnetic poles such as 7, of alternate names south and north polarity in the ring, and a magnetic yoke ring 8, secured to the plate 6 by means of spacer bars such as 9. The brushes such as shown at 13 are carried by the ring 8 and slide over the armature winding at a place where the armature disk member applies against the extension 3 of the sleeve 2 on its other face. Said brushes may as well be carried by the plate 6 if desired, between the inductor poles and they may bear against the armature at any other place subject of the provision of counterbrush members bearing on the other face of the armature for balancing out the mechanical pressure of the brushes against the armature. Such latter arrangements may be used when the yoke ring 8 is attached to the armature disk and not a separate mechanical member therefrom.

The inductor cage which is thus formed is journalled on the sleeve 2 by means of ball-bearings or the like such as shown at 11, said bearings having one part secured to the plate 6 and the other part made for instance by the end of sleeve 2 for defining the annular location of the balls.

Further the plate 6 terminates into a sleeve 10 extending coaxially with the sleeve 2 and for instance of the same diameter as sleeve 2.

With such an arratngement it is apparent that, as long as one of the members is not secured to a shaft or a plate of a housing, there is no fixed relative angular position between said members.

A shaft 14 may then be passed through the sleeve 2 and the sleeve 10, and the sleeve 2 may be secured to said shaft 14 by key 15, FIG. 2. The inductor cage is secured to a base plate 16 of the housing of the machine with the required angular position of the brushes with respect to the said base plate 16, wherein ducts such as shown at 18 are provided for the passage of the supply wires to the brushes. Bearings such as 17 are provided, preferably between said plate 16 and the sleeve 2 rather than between said plate 16 and the shaft 14.

In contradistinction, as shown in FIG. 3, it may be preferred to secure the shaft 14 to the sleeve 10 of the inductor structure by pin 19, and to secure the armature with the required angular position to the base plate 20 of the housing. The shaft 14 extends into bearings 21 mounted in the base plate. In such a case however, the brushes 13 rotate with the inductor structure and it is necessary to bring the brush leads out to fixed brushes such as 22 carried by the base plate 20. To this purpose, and complementing the above-described arrangement of FIG. 1, two collector rings 23 and 24 are provided on the yoke member 8 for cooperation with two fixed brushes or sliders 22. Said collector rings are insulated from the material of the ring 8 when said material is conductive. Each collector ring is connected to one brush or set of brushes of the machine according whether the winding is of the series-wave or of the lap or mesh wound type.

With such complementary provision of collector rings the arrngement of FIG. 1 may further be used for rotary machines wherein there is a relative displacement between the inductor and the armature members, mainly for instance for obtaining differential motors. For such a purpose, FIGS. 4 to 6, a toothed wheel 26 is secured to the sleeve 2 and another toothed wheel 27 is scured to the inductor cage, for instance to the bars 9 or for a sleeve substituted for said bars 9. Planetary wheels such as shown at 28 are mounted on fixed shafts 29 attached to the housing of the machine and cooperate with said toothed wheels 26 and 27.

FIG. 4 shows an embodiment wherein the sleeve 2 is secured to the shaft 14 by the key 15. The housing comprises the plate 20 and the bell-shaped member 32. The plate 20 which carries the brushes 22 is mounted by means of the bearings 31 on the armature sleeve 2 and the shaft 14 passes through said plate within bearings 21. The bell-shaped member 32 is mounted by means of bearings 30 on the sleeve 10 of the inductor cage. At 33 and 34 are shown setting nuts for attaching the roll-carrier members of the bearings 30 and 21. On the plate 20 are mounted the axles 29 of the planetary wheels 28, each wheel engaging the wheel 26 attached to the armature sleeve and the wheel 27 attached to the inductor cage. As in any one of FIGS. 1 to 5, the right hand half-view is taken according to a cross-section plane different from that of the left-hand view, this latter view passing through a plane of a brush of the machine.

FIG. 5 shows an embodiment similar to the one of FIG. 4 except that in FIG. 5, it is the sleeve 10 of the inductor which is secured to the shaft 14, by the pin 19. The remaining arrangement is identical to that of FIG. 4. In FIGS. 4 and 5, the plate 20 serves as a planet ring for planet gears 28.

The main feature of such arrangements as in FIGS. 4 and 5 is in the fact that the output torque is greater than the driving torque. The useful power, P, may be written under two relations:

(i) $\qquad P = C_0 \cdot W_0$ (ii) $\qquad P = C_m \cdot (w_0 + w_1)$ which gives:

(iii) $\qquad C_0 \cdot W_0 = C_m \cdot (w_0 + w_1)$ wherein $C_0$ denotes the output torque on the shaft 14, $C_m$, the driving torque (electromagnetic torque developed between inductor and armature), $w_0$, the speed of rotation of the output shaft and $w_1$, the speed of rotation of the member unrelated to said output shaft. The ratio $(w_0 + w_1)/w_0$ is obviously higher than 1 and its actual value is determined by the differential gear ratio between the armature and the inductor of the machine.

As the ratio of the speeds of the inductor and the armature is determined by the diameters of the toothed wheels connected to said members, the output shaft will rotate at a lower speed in the arrangement of FIG. 5 with respect to the arrangement of FIG. 4, all other factors being equal or identical.

Concerning the armature winding proper, it is as said a two face "printed circuit" winding of a previously disclosed kind so that the detail thereof is not to be given here. Reference may be made to co-pending application No. 1,128/60, filed January 7, 1960, as a divisional and continuation-in-part application of older application No. 691,434 dated October 21, 1957.

What is claimed is:

1. An assembly for an axial air-gap type of electric machine comprising, in combination, first and second sleeves having the same internal diameters and arranged in axial alignment, means consisting of a bearing supporting said second sleeve on said first sleeve and joining adjacent ends of said sleeves carried by the other and holding said sleeves in axial alignment and for relative rotation about a common axis, a magnetic field structure carried entirely by said first sleeve and including magnetic parts forming a narrow annular air-gap concentric with said common axis and surrounding said second sleeve, and a disc-type armature mounted on said second sleeve and carrying an annular winding located in said annular air-gap, said magnetic parts being magnetized to establish a magnetic flux across said air-gap and passing through said winding.

2. An electric machine structure according to claim 1 and including a shaft extending through both of said sleeves, and means securing one of said sleeves to said shaft.

3. An electric machine structure according to claim 2 and including means surrounding said shaft for holding the other of said sleeves against rotation.

4. An electric machine structure according to claim 2 and including planetary gearing connected between said sleeves, said gearing comprising, a first gear connected to and rotating with said first sleeve, a second gear connected to and rotating with said second sleeve, a planet ring surrounding said shaft, and a plurality of planet gears journalled on said planet ring, each planet gear having operative engagement with said first and second gears.

5. An electric machine structure according to claim 4 wherein said planet ring comprises a part of a housing for said machine.

6. A machine structure according to claim 1 and including brushes carried by said magnetic field structure and having sliding contact with the winding on said disc armature.

7. A machine structure according to claim 6 and including a shaft extending through both of said sleeves, means connecting said shaft to rotate said second sleeve and the armature carried thereby, and means holding said field structure against rotation.

8. A machine structure according to claim 2 wherein said shaft is connected to rotate said first sleeve and the magnetic field structure carried thereby, a brush carried by said field structure and having sliding contact with the winding on said armature, a collector ring mounted to rotate with said field structure and connected to said brush, and a stationary brush having sliding contact with said collector ring.

References Cited by the Examiner

UNITED STATES PATENTS

| | | | |
|---|---|---|---|
| 613,894 | 11/1898 | Vaughan-Sherrin | 310—115 |
| 1,223,400 | 4/1917 | Kurtz | 310—115 |
| 2,658,157 | 11/1953 | Brouwer | 310—268 |
| 2,681,564 | 6/1954 | Jeromson et al. | 310—232 |
| 2,970,238 | 1/1961 | Swiggett | 310—268 |

ORIS L. RADER, *Primary Examiner.*

DAVID X. SLINEY, MILTON O. HIRSHFIELD, *Examiners.*

UNITED STATES PATENT OFFICE
CERTIFICATE OF CORRECTION

Patent No. 3,230,408                          January 18, 1966

Jacques Henry-Baudot

It is hereby certified that error appears in the above numbered patent requiring correction and that the said Letters Patent should read as corrected below.

Column 2, line 2, after "said" insert -- pole --; line 30, for "of", first occurrence, read -- to --; column 3, line 7, for "ararngement" read -- arrangement --; line 13, for "scured" read -- secured --; line 14, for "for", first occurrence, read -- to --; column 4, line 10, strike out "carried by the other".

Signed and sealed this 3rd day of January 1967.

(SEAL)
Attest:

ERNEST W. SWIDER                            EDWARD J. BRENNER
Attesting Officer                                Commissioner of Patents